(No Model.) 3 Sheets—Sheet 1.
A. MARLOR.
BRICK MACHINE.

No. 341,928. Patented May 18, 1886.

Witnesses.
W. Rossiter
Paul Hanson

Inventor:
Alfred Marlor
By Price & Fisher
His Attys.

(No Model.) 3 Sheets—Sheet 3.
A. MARLOR.
BRICK MACHINE.
No. 341,928. Patented May 18, 1886.
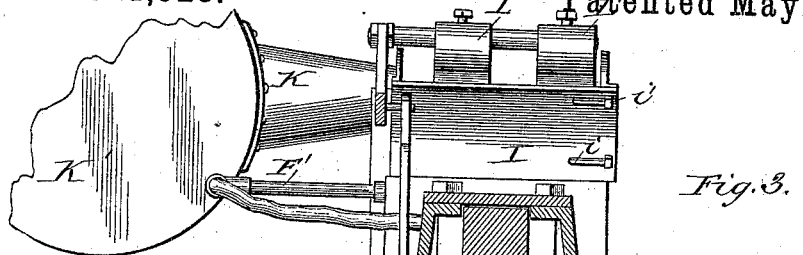
Fig. 3.
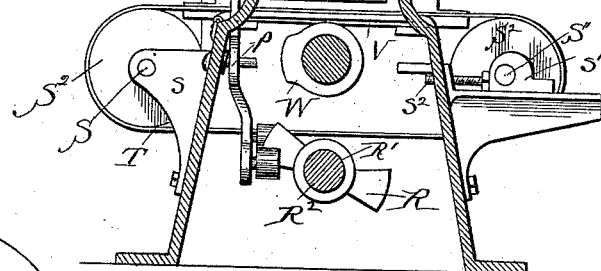
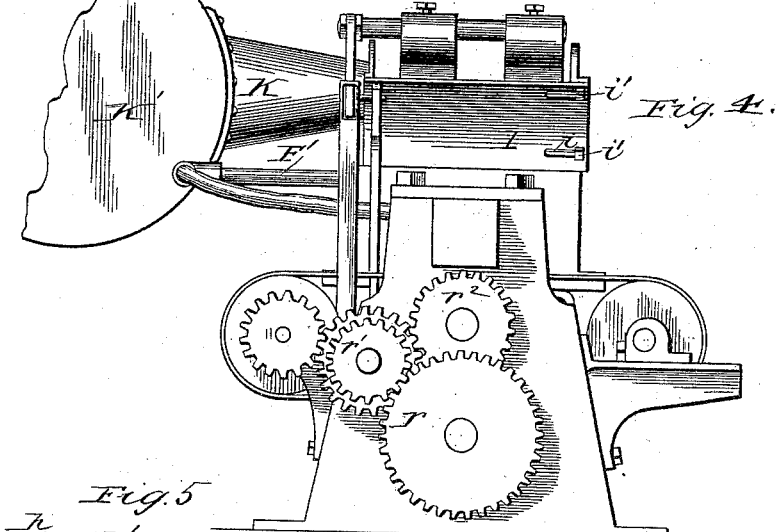
Fig. 4.
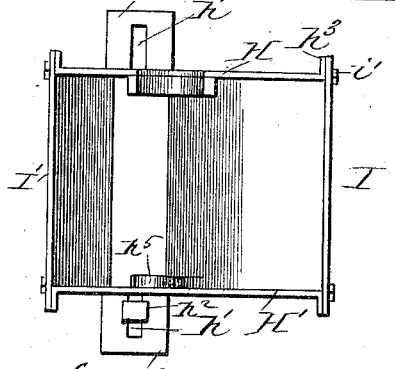
Fig. 5.
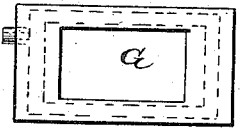
Fig. 6.
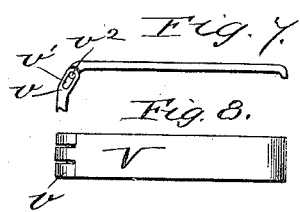
Fig. 7.
Fig. 8.
Witnesses.
W. Rossiter
Paul Hanson
Inventor.
Alfred Marlor
By Pierce & Fisher
His Attys.
N. PETERS, Photo-Lithographer, Washington, D.C.

UNITED STATES PATENT OFFICE.

ALFRED MARLOR, OF HANCOCK, MICHIGAN.

BRICK-MACHINE.

SPECIFICATION forming part of Letters Patent No. 341,928, dated May 18, 1886.

Application filed July 13, 1885. Serial No. 171,496. (No model.)

*To all whom it may concern:*

Be it known that I, ALFRED MARLOR, a citizen of the United States, residing at Hancock, in the county of Houghton and State of Michigan, have invented certain new and useful Improvements in Brick-Machines, of which I do declare the following to be a full, clear, and exact description, reference being had to the accompanying drawings, forming part of this specification.

My present invention has relation to the improvement of machines for making plain and fancy bricks, tiles, and like articles of plastic material, and in particular does it relate to the improvement of that class of machines in which the plastic material is fed from a hopper in measured quantity into a mold and between reciprocating presser-heads, and after having been pressed into the desired form is discharged from the machine by an endless carrier-belt.

The objects of my invention are, first, to improve the construction of hopper wherein the plastic clay is received from the pug-mill, and to combine therewith an improved form and arrangement of knife mechanism for severing the clay core into proper lengths for forming succeeding bricks; secondly, to provide improved mechanism for imparting the requisite reciprocating movements to the slide-bars by which the presser-heads are carried; thirdly, to improve the discharge-belt mechanism by which the bricks are carried from the machine. These several objects of invention I have accomplished by the mechanism hereinafter described, illustrated in the accompanying drawings, and particularly defined in the claims at the end of this specification.

Figure 1:
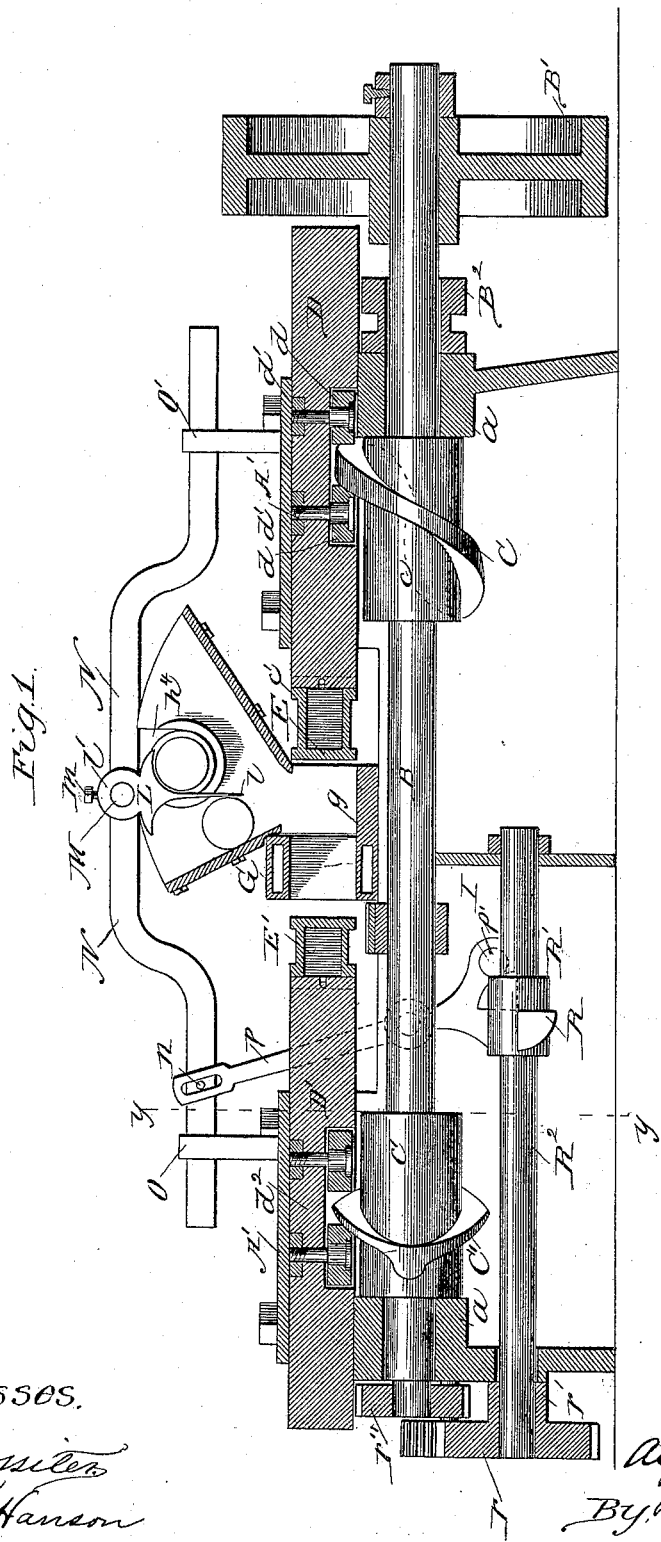
Figure 2:
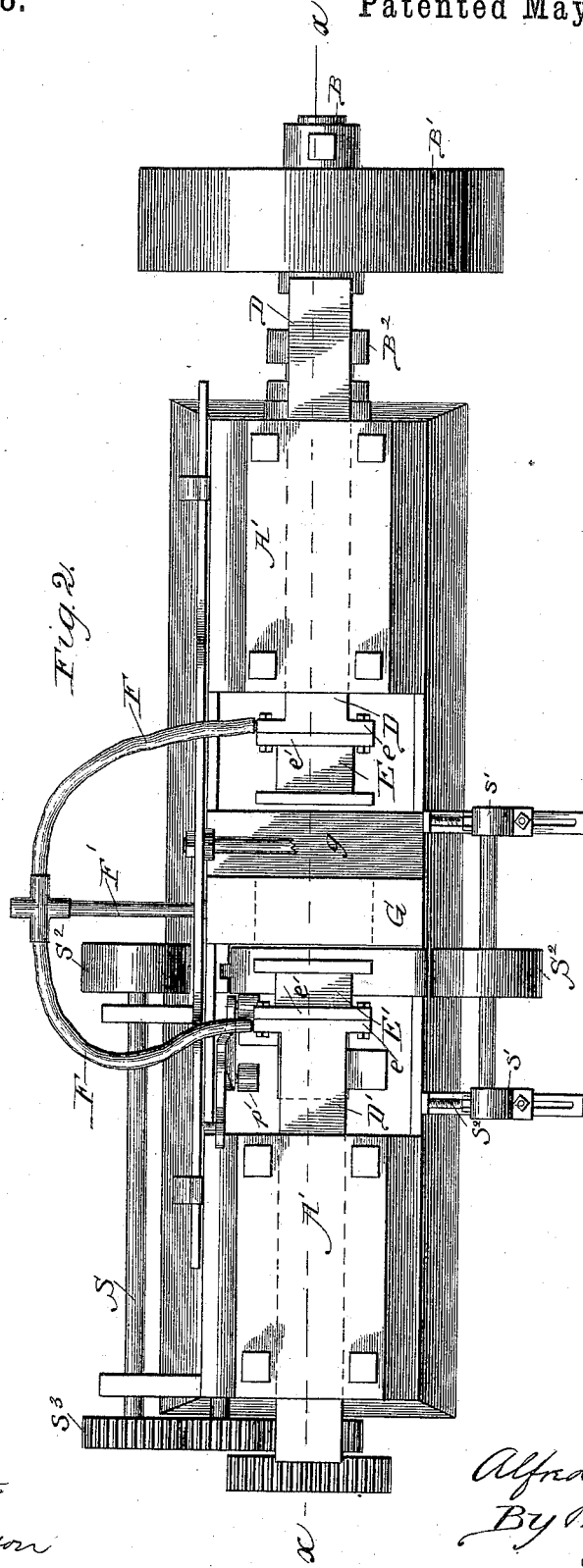

Figure 1 is a view in central longitudinal section on line $x\ x$ of Fig. 2. Fig. 2 is a plan view with the hopper removed. Fig. 3 is a view in vertical transverse section on line $y\ y$ of Fig. 1. Fig. 4 is a view in end elevation. Fig. 5 is a plan view of the hopper detached. Fig. 6 is a face view of the mold. Fig. 7 is a side view, and Fig. 8 is a plan view of the lifting-table.

A designates the main frame, in the ends $a$ of which are suitably journaled the main shaft B of the machine, to which shaft motion will be imparted from the source of power through the drive-wheel B′, fitted loosely upon the shaft, but gearing therewith by means of a clutch, $B^2$, of any desired construction. At proper distances on the main shaft B are keyed the sleeves of cylinders $c$ and $c'$, that are provided, respectively, with the cams or cam-ribs C and C′, preferably of substantially the shape shown. The cam C extends between the friction-rollers $d$, attached by studs $d'$ to the under side of the slide-bar D, that carries at its inner end the presser-head E, and is sustained between the sides upon the end $a$ and beneath the top plate, A′, of the main frame. In like manner, also, the cam C′ works between the friction-rollers $d^2$ on the under side of the slide D′, that carries the presser-head E′, and is sustained by the main frame in the same way as is the slide-bar D. The presser-heads E and E′ are hollow castings, adapted to receive steam from the flexible pipes F, that connect with the source of supply and with suitable ports in the flanges $e$ of the slide-bars, to which the flanges $e'$ of the presser-heads are bolted. Between the presser-heads is placed the mold G, that is formed hollow for the admission of steam that will be delivered thereto by means of the supply-pipe F′, and the bottom of this mold is expanded, as shown, to form a table, $g$, whereon the clay may drop from the hopper. It will be observed that the presser-head E′ need move through a very small space only in approaching to and receding from the mold, whereas the presser E moves a much greater distance, as it is necessary that it shall pass beneath the mouth of the hopper and entirely through the mold in order to properly discharge the bricks. It is for this reason that the cam C, which must impart the necessary long movement to the slide-bar D and presser-head E, is made very long, while the cam C′, that actuates the slide-bar D′ and presser-head E′, is made correspondingly short.

The mechanism for delivering the plastic clay in proper quantities between the presser-heads will next be described. Across the top of the main frame at a point above the table $g$ of the mold extends what I designate the "delivery-hopper," the ends H and H′ of which are provided with the feet $h$, having slots $h'$ therein, through which pass the set-screws $h^2$, by which the ends of the hopper are adjustably held in place on the machine. The sides I and I' of the hopper are each provided with the long slots $i$, through which pass the set-screws $i'$, that enter the flanges $h^3$ of the ends of the hopper, and serve to adjustably secure the sides and ends of the hopper together. The end H of the hopper is cut away, as shown at $h^4$, to receive the snout or nozzle K, that leads from the pug-mill K' and delivers the plastic clay to the hopper in the shape of a cylindrical core. Upon the inner face of the end H' of the hopper is formed the ring or hub $h^5$, the purpose of which will presently appear. Within the hopper are placed the knives L and L', the blades $l$ of which extend to near the bottom of the hopper, and the upper portions or butts of which are expanded, as shown at $l'$, and by means of the set-screws $m$ are adjustably held upon the rod M, that is bolted to the reciprocating bar N. This bar N is sustained in a manner free to slide by the end of the standards O and O', bolted to the main frame, and from the side of this bar projects the pin $n$, over which fits the slotted end of the vibrating lever P, that is journaled to the main frame at $p$, and is provided at its lower end with the friction-rollers $p'$, between which move the cam-shaped tappets R, formed upon the sleeve R', that is keyed to the shaft $R^2$. This shaft is journaled in suitable bearings in the main frame, and at its outer end is provided with the cog gear-wheel $r$, which meshes with the cog-wheel $r'$, that is in gear with the cog-wheel $r^2$, keyed upon the end of the main driving-shaft B.

Within suitable bearings, $s$ and $s'$, at the opposite sides of the main frame, are journaled the shafts S and S', upon the pulleys $S^2$ of which will be carried the discharge-belt T. The journal-bearings of the shaft S' are made adjustable by means of the screws $s^2$, which work in suitable seats in the main frame, the purpose of this adjustment being to properly control the tension of the discharge-belt. Beneath the upper portion of this discharge-belt extends the table V, which is connected at one end, as at $v$, to one side of the main frame. The stud $v$, to which the end of the table is connected, is provided with the long slots $v'$, within which is held, in a manner free to move in vertical direction, the pivot-pin $v^2$ on the end of the table, and by this means it will be seen that the table can be lifted freely in vertical direction. Beneath this table and fixed to the main shaft B is the lifting-cam W, the purpose of which is to raise the table and the discharge-belt at proper intervals to receive the molded bricks, as will presently appear. The shaft S of the discharge-belt is provided at its outer end with the cog-wheel $s^3$, which, through the medium of suitable cog-wheels, as seen in Fig. 4, is geared with the main driving-shaft in such manner as to receive a continuous movement therefrom.

From the foregoing description the operation of the parts will be seen to be as follows: The clay in a plastic condition enters from the pug-mill through the snout or nozzle into the delivery-hopper at one side of the knives L and L'. The knife L is so adjusted upon the rod M that its outer edge will bear closely against the nozzle of the pug-mill, and the knife L' is so fixed upon this rod as to bear snugly against the hub $h^5$ upon the inner face of the end H' of the hopper. When the core of clay has passed across the hopper, the knives will be reciprocated by the rod N and its operating mechanism in such manner that the knife L will sever the core of clay at the discharge-nozzle, and the knife L', in conjunction with the hub or ring $h^5$, make a clean-cut end. The clay thus cut will be the quantity requisite to form a single brick, and will be held by the knives against the side of the hopper until the knives begin to move in the opposite direction to sever the material for the next succeeding brick. At this instant the severed clay will fall upon the table $g$ of the mold, and the slide-bars, carrying the presser-heads, will be moved by the cams C and C' in such manner that the clay will be forced by the presser-head E into the mold, and after having been properly shaped the presser-head E' will be withdrawn, and the presser-head E will continue to move the brick until it is forced from the mold. At this moment the cam W upon the main drive-shaft lifts the table and the discharge-belt to the level of the under side of the mold, and receives the brick as it is forced from the mold by the presser-head E. After the molded brick is placed upon the discharge-belt the cam W moves from beneath the table V, permitting this table to drop and the discharge-belt to be lowered in such manner as to allow the presser-head E' to move forward for the molding of the next succeeding brick. From the construction and relation of the delivery-hopper and the knives therein it will be seen that after the knives have severed a quantity of clay from the main core it will retain the same against the side of the hopper until the preceding quantity has been formed into a brick and until the presser-head E has been drawn back from the table $g$ of the mold. This feature is of importance, as it insures the delivery at the proper time of the exact quantity of clay necessary to form each brick. It will be seen that when bricks of smaller size are to be formed the knives L and L' will be set more nearly together upon the rod M, and the ends of the hopper will be adjusted by means of the set-screws $h^4$ and $i'$ toward each other in such manner as to conform to the changed position of these knives.

It will be understood that various modifications of the details of construction above set out may be made without departing from the spirit of my invention, and when required the shape and construction of the presser-heads and mold can be so varied as to form fancy bricks or tiles of any desired configuration.

Having thus described my invention, what I claim as new, and desire to secure by Letters Patent, is—

1. In a brick-machine, the combination, with the hopper having an opening at its end to receive the clay, of a vertical knife, the blade whereof is sustained within said hopper at right angles to the plane of its end opening, and a reciprocating bar in connection with said knife for moving the same in lateral direction across the end opening, substantially as described.

2. In a brick-machine, the combination, with the hopper having an opening at its end to receive the clay, of vertical knives, the blades whereof are sustained within said hopper at right angles to the plane of its end opening, a bar whereon said knives are adjustably held, and a reciprocating bar for moving said knives in lateral direction across the end opening of the hopper, substantially as described.

3. In a brick-machine, the combination, with the hopper having a delivery-opening for the clay, of the vertical knives L L, the bar M, whereon said knives are held, the reciprocating bar N, the vibrating lever P, the tappets R R, and the shaft R², substantially as described.

4. In a brick-machine, the combination, with the hopper having a feed-opening to receive the clay and having inclined sides and discharge-opening, of a broad vertical reciprocating knife, the blade whereof is arranged at right angles to the feed-opening of the hopper, and a reciprocating bar for imparting movement to the said knife, substantially as described.

5. In a brick-machine, the combination, with the hopper having a delivery-opening at its end for the clay and made adjustable in the direction of its length, of an adjustable knife sustained within said hopper and having its blade extending at right angles to the plane of its delivery-opening, substantially as described.

6. In a brick-machine, the combination of the mold, the hollow presser-heads having flexible pipes connected thereto, the reciprocating slide-bars, to which said presser-heads are bolted, the main drive-shaft, and the cams for operating the slide-bars mounted upon said shaft, substantially as described.

7. In a brick-machine, the combination, with the mold, the presser-heads, and the slide-bars, of the friction-rollers 55, the cams C and C′, adapted to move between the friction-rollers, and the main shaft B, whereon said cams are mounted, substantially as described.

8. In a brick-machine, the combination, with the mold and the presser-heads, of the discharge-belt and a vertically-movable table beneath said belt for lifting the same, substantially as described.

9. In a brick-machine, the combination, with the mold and the presser-heads, of the discharge-belt T, the hinged table V beneath said belt, the cam W, for lifting said table, and shaft B, substantially as described.

ALFRED MARLOR.

Witnesses:
WILLIAM CARLINE,
MICHAEL FINN.